United States Patent
Teach

[11] 3,852,348
[45] Dec. 3, 1974

[54] ETHER AND SULFIDE META-SUBSTITUTED PHENYL UREAS

[75] Inventor: Eugene G. Teach, El Cerrito, Calif.

[73] Assignee: Stauffer Chemical Company, New York, N.Y.

[22] Filed: Mar. 12, 1973

[21] Appl. No.: 340,142

Related U.S. Application Data

[62] Division of Ser. No. 90,854, Nov. 18, 1970, abandoned.

[52] U.S. Cl...... 260/553 A, 260/552 R, 260/553 C, 71/93, 71/99, 71/100, 71/115, 71/120
[51] Int. Cl............................................. C07c 127/18
[58] Field of Search.............................. 260/553 A

[56] References Cited
UNITED STATES PATENTS
2,655,447  10/1953  Todd............................. 260/553 A FOREIGN PATENTS OR APPLICATIONS
999,862  7/1965  Great Britain................. 260/553 A Primary Examiner—Leon Zitver
Assistant Examiner—Michael W. Glynn
Attorney, Agent, or Firm—Harry A. Pacini; Daniel C. Block; Edwin H. Baker

[57] ABSTRACT

Ether and sulfide meta-substituted phenyl ureas having the formula

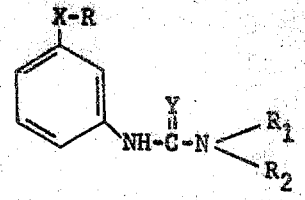

in which X is oxygen or sulfur; Y is oxygen or sulfur; R is alkyl, alkenyl, vinyloxyalkyl, alkylthioalkyl, alkyloxyalkyl, and ketoalkyl; $R_1$ is hydrogen or lower alkyl; $R_2$ is lower alkyl, alkoxyphenyl, alkenyl, cycloalkyl, and phenyl; provided that when X is oxygen, Y is oxygen, R is alkyl containing 1 to 3 carbon atoms, and $R_1$ is hydrogen or lower alkyl, then $R_2$ is other than lower alkyl containing 1 to 4 carbon atoms. The compounds of this invention are useful as herbicides.

9 Claims, No Drawings

ETHER AND SULFIDE META-SUBSTITUTED PHENYL UREAS

This is a division, of application Ser. No. 90,854 filed Nov. 18, 1970 now abandoned.

This invention relates to certain novel ether and sulfide meta-substituted phenyl ureas which are useful as herbicides. The compounds of the present invention are new compositions of matter and correspond to the general formula

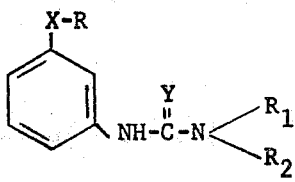

in which X is oxygen or sulfur; Y is oxygen or sulfur; R is alkyl, alkenyl, vinyloxyalkyl, alkylthioalkyl, alkyloxyalkyl, and ketoalkyl; $R_1$ is hydrogen or lower alkyl; $R_2$ is lower alkyl, alkoxyphenyl, alkenyl, cycloalkyl and phenyl; provided that when X is oxygen, Y is oxygen, R is alkyl containing 1 to 3 carbon atoms, and $R_1$ is hydrogen or lower alkyl, then $R_2$ is other than lower alkyl containing 1 to 4 carbon atoms.

In a preferred form, the invention relates to compositions having the formula

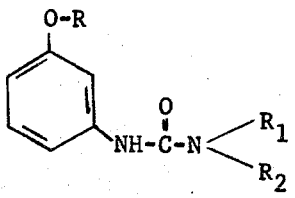

in which R is branched chain alkyl having 4 to 8 carbon atoms, inclusive, and $R_1$ is hydrogen or lower alkyl having 1 to 4 carbon atoms, inclusive, and $R_2$ is lower alkyl having 1 to 4 carbon atoms, inclusive, and their utility as herbicides.

In another preferred form, the invention relates to compositions having the formula

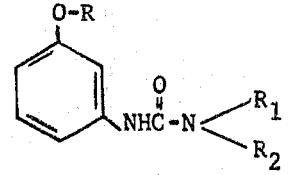

in which R is ketoalkyl of the formula

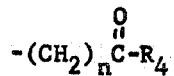

wherein n is 1 or 2 and $R_4$ is straight or branched chain alkyl having 1 to 4 carbon atoms, inclusive, $R_1$ is hydrogen or lower alkyl having 1 to 4 carbon atoms, inclusive, $R_2$ is lower alkyl having 1 to 4 carbon atoms, inclusive, or alkenyl having 3 to 6 carbon atoms, inclusive, and their utility as herbicides.

In the above description, the following embodiments are intended for the various substituent groups, unless otherwise provided; for R, alkyl preferably includes those members which contain 1 to 10 carbon atoms, inclusive, in both straight chain and branched chain configurations, for example, methyl, ethyl, n-propyl, isopropyl, n-butyl, sec.-butyl, 1,1-dimethylbutyl, amyl, isoamyl, 2,3,3-trimethylpentyl, n-hexyl, isohexyl, n-heptyl, n-octyl, isooctyl, nonyl, decyl, and 3,7-dimethyloctyl; for $R_1$ and $R_2$, lower alkyl preferably includes those members which contain from 1 to 4 carbon atoms, inclusive, in straight and branched chain configurations, for example, methyl, ethyl, n-propyl, isopropyl, n-butyl, and sec.-butyl; for $R_1$ and $R_2$, alkenyl preferably includes those members containing 3 to 6 carbon atoms, inclusive. In R, the terms vinyloxyalkyl, alkylthioalkyl and alkyloxyalkyl preferably include those members in which the total carbon content is not more than 7, for example, vinyloxymethyl, vinyloxyethyl, vinyloxypentyl, methylthiomethyl, methylthioethyl, methylthiopropyl, ethylthioethyl, ethylthiopentyl, propylthiopropyl, propylthiobutyl, butylthiomethyl, hexylthiomethyl, methyloxymethyl, ethyloxyethyl, ethyloxybutyl, butyloxyethyl, butyloxypropyl, hexyloxymethyl and the like. By the term ketoalkyl is meant those members of the group which have the formula

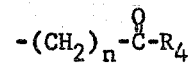

in which n is 1 or 2 and $R_4$ is alkyl containing from 1 to 4 carbon atoms, inclusive, in straight chain and branched chain configurations, for example, methyl, ethyl, n-propyl, isopropyl, n-butyl, sec.-butyl, tert.-butyl and the like. In $R_2$, the term cycloalkyl preferably includes those members of the group which contain from 3 to 6 carbon atoms, inclusive, for example, cyclopropyl, cyclobutyl, cycloamyl and cyclohexyl. In $R_2$ in the term alkoxyphenyl, alkoxy preferably includes those members of the group which contain from 1 to 4 carbon atoms, inclusive, for example, methoxy, ethoxy, propoxy, n-butoxy and iso-butoxy.

The compounds of this invention have been found to be active herbicides of a general type. That is, certain members of the class have been found to herbicidally effective against a wide range of plant species. A method of controlling undesirable vegetation of the present invention comprises applying an herbicidally effective amount of the above-described compounds to the area or plant locus where control is desired.

An herbicide is used herein to mean a compound which controls or modifies the growth of plants. By a "growth controlling amount" is meant an amount of compound which causes a modifying effect upon the growth of plants. Such modifying effects include all deviations from natural development, for example, killing, retardation, defoliation, desiccation, regulation, stunting, tillering, stimulation, dwarfing and the like. By "plants" it is meant germinating seeds, emerging seedlings, and established vegetation, including the roots and above-ground portions.

The compounds of the present invention are prepared by several different methods, depending upon the nature of the starting materials and the products desired. Either of the substituents R or

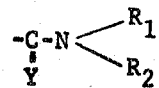

can be added first with the other, then added by the appropriate reaction. For example, meta-aminophenol or meta-aminothiophenol can be alkylated by conversion to the sodium salt in a solvent, such as dimethylformamide. The sodium salt is then reacted with an alkyl halide to obtain the corresponding ether or sulfide meta-substituted aniline. The urea moiety is then completed by reaction with an isocyanate or carbamyl chloride. Alternatively, meta-aminophenol or thiophenol can be reacted with an isocyanate to obtain the meta hydroxy or thiolphenyl urea. The meta-hydroxy or thiolphenyl urea is alkylated in a solvent, such as dimethylformamide. In each instance after the reaction is complete, the recovery of the product is carried out by normal work-up procedures, such as crystallization, sublimation or distillation.

The compounds of the present invention and their preparation are more particularly illustrated by the following examples. Following the examples is a table of compounds which are prepared according to the procedures described herein.

EXAMPLE I

Preparation of 1[3′-(3,3-dimethylbutoxy)phenyl]-3-methyl urea.

Eleven and six-tenths (11.6) grams of 1(3′-hydroxyphenyl)3-methyl urea is dissolved in 100 ml. of dimethylformamide and reacted with 15.1 g. of 25 percent sodium methoxide in methanol solution. The methanol is removed by distillation under vacuum and 8.5 g. of 3,3-dimethyl-1-chlorobutane is added and the mixture refluxed for four hours. The reaction mixture is poured into approximately 500 ml. of cold water and the product which crystallized out is recovered by filtration, washed with dilute NaOH and water and dried under vacuum. There is obtained a yield of 11.8 g. of the title compound, m.p. 98.5°–101°C.

EXAMPLE II

Preparation of 1[3′-(3,3-dimethylbutoxy)phenyl]3,3-dimethyl urea.

Thirteen and one-half (13.5) grams of 3′(3,3-dimethyl-butoxy)aniline, 7.6 g. of dimethyl carbamoyl chloride, 7.1 g. of triethylamine in 100 ml. of acetone are refluxed for eight hours and allowed to stir overnight. The mixture is poured into approximately 500 ml. of water and the oily product is extracted with methylene chloride and washed with dilute NaOH, dilute HCl and water and dried over magnesium sulfate. The methylene chloride is evaporated under vacuum. There is obtained 13 g. of the title compound, $n_D^{30} = 1.5290$.

EXAMPLE III

Preparation of 1(3′-isobutoxy phenyl)3-methyl thiourea.

Thirteen and two-tenths (13.2) grams of 3′-isobutoxy aniline is dissolved in 100 ml. of acetone and 5.8 g. of methyl isothiocyanate is added and the mixture heated at reflux for one hour. The solution is cooled and poured into approximately 500 ml. of cold water and the liquid product is taken up in approximately 200 ml. of ethyl acetate and washed with dilute sodium hydroxide, dilute HCl, water, and dried over magnesium sulfate. The solvent is removed under vacuum. There is obtained 9.5 g. of the title compound, $n_D^{30} = 1.5900$.

EXAMPLE IV

Preparation of 1-3′(2-keto-3,3-dimethylbutoxy)phenyl-3-methyl urea.

Eleven and six-tenths (11.6) grams of 1-(3′-hydroxy phenyl)3-methyl urea is dissolved in 100 ml. of dimethyl formamide and 15.1 g. of 25 percent sodium hydroxide in methanol is added. The methanol is distilled off under vacuum. 12.5 g. of 1-bromopinacolone is added and the mixture becomes warm and NaBr precipitates. After stirring for two to three hours, the mixture is poured into approximately 500 ml. of water and the product taken up in methylene chloride, washed with dilute (approximately 1 percent) NaOH and 5 percent HCl and dried over magnesium sulfate. The solvent is removed under vacuum. There is obtained 14.0 g. of the title compound, $n_D^{30} = 1.5268$.

Compound numbers have been assigned to the compounds in the following table and are used for identification throughout the balance of the specification.

TABLE I

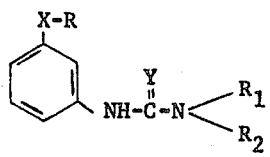

| COMPOUND NUMBER | X | Y | R | $R_1$ | $R_2$ | m.p. °C. or $n_D^{30}$ |
|---|---|---|---|---|---|---|
| 1 | O | O | $(CH_3)_3CCH_2CH_2-$ | H | $CH_3-$ | 98.5–101 |
| 2 | O | O | $CH_2=CH-CH_2-$ | H | $C_2H_5-$ | 87–90 |
| 3 | O | O | $(CH_3)_3CCH_2CH_2-$ | H | $C_2H_5-$ | 109–111 |
| 4 | O | O | $n-C_4H_9-$ | H | $i-C_3H_7-$ | 125–127 |
| 5 | O | O | $n-C_6H_{13}-$ | H | $i-C_3H_7-$ | 99.5–103 |
| 6 | O | O | $(CH_3)_3CCH_2CH_2-$ | H | $i-C_3H_7-$ | 114–118 |
| 7 | O | O | $i-C_4H_9-$ | H | $CH_3-$ | 124–126 |
| 8 | O | O | $i-C_4H_9-$ | H | $C_2H_5-$ | 108–111 |
| 9 | O | O | $i-C_4H_9-$ | H | $i-C_3H_7-$ | 121–127 |

TABLE I (continued)

| COMPOUND NUMBER | X | Y | R | $R_1$ | $R_2$ | m.p. °C. or $n_D^{30}$ |
|---|---|---|---|---|---|---|
| 10 | O | O | i-$C_4H_9$- | H | n-$C_4H_9$- | 1.4990 |
| 11 | O | O | i-$C_4H_9$- | H | t-$C_4H_9$- | 160-165 |
| 12 | O | O | i-$C_5H_{11}$- | H | $CH_3$- | 95-97.5 |
| 13 | O | O | i-$C_5H_{11}$- | H | $C_2H_5$- | 94-97.5 |
| 14 | O | O | i-$C_5H_{11}$- | H | i-$C_3H_7$- | 119-121 |
| 15 | O | O | i-$C_5H_{11}$- | H | n-$C_4H_9$- | 65.5-69 |
| 16 | O | O | i-$C_5H_{11}$- | H | t-$C_4H_9$- | 110-114 |
| 17 | O | O | $(CH_3)_3CCH_2CH_2$- | H | n-$C_4H_9$- | 1.5049 |
| 18 | O | O | $(CH_3)_3CCH_2CH_2$- | H | t-$C_4H_9$- | Glass |
| 19 | O | O | i-$C_4H_9$- | $CH_3$- | $CH_3$- | 89-95 |
| 20 | O | O | i-$C_5H_{11}$- | $CH_3$- | $CH_3$- | 1.5390 |
| 21 | O | S | i-$C_4H_9$- | H | $CH_3$- | 1.5900 |
| 22 | O | O | $CH_2=C(CH_3)CH_2$- | H | $CH_3$- | 95-97 |
| 23 | O | O | $CH_2=C(CH_3)CH_2$- | $CH_3$- | $CH_3$- | 1.5348 |
| 24 | O | O | $CH_2=C(CH_3)CH_2$- | H | $C_4H_9$- | 1.5365 |
| 25 | O | O | $C_3H_7CH(CH_3)CH_2$- | H | $CH_3$- | 1.5293 |
| 26 | O | O | $C_3H_7CH(CH_3)CH_2$- | H | $C_4H_9$- | 1.5189 |
| 27 | O | O | $(CH_3)_2CH(CH_2)_3CH(CH_3)CH_2CH_2$- | H | $CH_3$- | 1.5148 |
| 28 | O | O | $(CH_3)_2CH(CH_2)_3CH(CH_3)CH_2CH_2$- | H | $C_4H_9$- | 1.5067 |
| 29 | O | O | $C_2H_5OCH_2CH_2$- | H | $CH_3$- | 1.5450 |
| 30 | O | O | $C_2H_5OCH_2CH_2$- | $CH_3$- | $CH_3$- | 1.5408 |
| 31 | O | O | $CH_2=CH-O-C_2H_4$- | H | $CH_3$- | 117-118 |
| 32 | O | O | $CH_2=CH-O-C_2H_4$- | H | $C_4H_9$- | 91-93 |
| 33 | O | O | $(CH_3)_2C=CH-CH_2$- | H | $CH_3$- | 1.5392 |
| 34 | S | O | $(CH_3)_3CCH_2CH_2$- | H | $CH_3$- | 1.5543 |
| 35 | O | O | $(CH_3)_3CSCH_2$- | H | $CH_3$- | 163-167 |
| 36 | O | O | $(CH_3)_3CSCH_2$- | H | $C_4H_9$- | 1.5410 |
| 37 | O | O | $(CH_3)_3CSCH_2$- | $CH_3$- | $CH_3$- | 1.5493 |
| 38 | O | O | i-$C_4H_9$- | H | m-i-$C_4H_9OC_6H_4$- | 157-158 |
| 39 | O | O | $(CH_3)_3CCOCH_2$- | H | $CH_3$- | 1.5268 |
| 40 | O | O | $(CH_3)_3CCOCH_2$- | H | $C_2H_5$- | 1.5318 |
| 41 | O | O | $(CH_3)_3CCOCH_2$- | H | i-$C_3H_7$- | 1.5265 |
| 42 | O | O | $(CH_3)_3CCOCH_2$- | H | n-$C_4H_9$- | 1.5164 |
| 43 | O | O | $(CH_3)_3CCOCH_2$- | H | t-$C_4H_9$- | 1.5010 |
| 44 | O | O | $CH_3COCH_2$- | H | $CH_3$- | 1.4788 |
| 45 | O | O | $CH_3COCH_2$- | H | t-$C_4H_9$- | 1.4799 |
| 46 | O | O | $(CH_3)_3CCOCH_2$- | H | n-$C_3H_7$- | 1.5363 |
| 47 | O | O | $(CH_3)_3CCOCH_2$- | H | $CH_2=CH-CH_2$- | 1.5413 |

TABLE I (continued)

| COMPOUND NUMBER | X | Y | R | $R_1$ | $R_2$ | m.p. °C. or $n_D^{30}$ |
|---|---|---|---|---|---|---|
| 48 | O | O | $(CH_3)_3CCOCH_2-$ | H | $c-C_6H_{11}-$ | 1.5333 |
| 49 | O | O | $(CH_3)_3CCOCH_2-$ | H | $C_6H_5-$ | 85-89 |
| 50 | O | O | $(CH_3)_3CCOCH_2-$ | $CH_3-$ | $CH_3-$ | 1.5350 |

Other examples of compounds falling within the generic formulas presented herein, which are preparable by the aforedescribed procedures and which may be formulated into herbicidal compositions and applied as herein illustrated are:

| X | Y | R | $R_1$ | $R_2$ |
|---|---|---|---|---|
| S | S | $(CH_3)_3CCH_2CH_2-$ | H | $CH_3-$ |
| S | S | $CH_2=CH-CH_2-$ | H | $C_2H_5-$ |
| S | S | $n-C_6H_{13}-$ | H | $i-C_3H_7-$ |
| S | S | $i-C_4H_9-$ | H | $t-C_4H_9-$ |
| S | S | $i-C_5H_{11}-$ | H | $C_2H_5-$ |
| S | S | $(CH_3)_3CCH_2CH_2-$ | H | $t-C_4H_9-$ |
| S | S | $i-C_4H_9-$ | $CH_3-$ | $CH_3-$ |
| S | S | $i-C_5H_{11}-$ | $CH_3-$ | $CH_3-$ |
| S | S | $CH_2=C(CH_3)CH_2-$ | H | $CH_3-$ |
| S | S | $CH_2=C(CH_3)CH_2-$ | $CH_3-$ | $CH_3-$ |
| S | S | $C_3H_7CH(CH_3)CH_2-$ | H | $CH_3-$ |
| S | S | $(CH_3)_2CH(CH_2)_3CH(CH_3)CH_2CH_2-$ | H | $CH_3-$ |
| S | S | $C_2H_5OCH_2CH_2-$ | H | $CH_3-$ |
| S | S | $C_2H_5OCH_2CH_2-$ | $CH_3-$ | $CH_3-$ |
| S | S | $CH_2=CH-O-C_2H_4-$ | H | $CH_3-$ |
| S | S | $(CH_3)_2C=CH-CH_2-$ | H | $CH_3-$ |
| S | S | $(CH_3)_3CCH_2CH_2-$ | H | $CH_3-$ |
| S | S | $(CH_3)_3CSCH_2-$ | H | $CH_3-$ |
| S | S | $(CH_3)_3CCOCH_2-$ | H | $CH_3-$ |
| S | S | $(CH_3)_3CCOCH_2-$ | H | $t-C_4H_9-$ |
| S | S | $CH_3COCH_2-$ | H | $CH_3-$ |
| S | S | $(CH_3)_3CCOCH_2-$ | H | $n-C_3H_7-$ |
| S | S | $(CH_3)_3CCOCH_2-$ | H | $CH_2=CH-CH_2-$ |
| S | S | $(CH_3)_3CCOCH_2-$ | H | $c-C_6H_{11}-$ |
| S | S | $(CH_3)_3CCOCH_2-$ | $CH_3-$ | $CH_3-$ |
| O | S | $CH_2=CH-CH_2-$ | H | $C_2H_5-$ |
| O | S | $n-C_6H_{13}-$ | H | $i-C_3H_7-$ |
| O | S | $i-C_4H_9-$ | $CH_3-$ | $CH_3-$ |
| O | S | $(CH_3)_2CH(CH_2)_3CH(CH_3)CH_2CH_2-$ | H | $CH_3-$ |
| O | S | $C_2H_5OCH_2CH_2-$ | H | $CH_3-$ |
| O | S | $CH_2=CH-O-C_2H_4-$ | H | $CH_3-$ |
| O | S | $(CH_3)_3CSCH_2-$ | H | $CH_3-$ |
| O | S | $(CH_3)_3CCOCH_2-$ | H | $CH_3-$ |
| O | S | $(CH_3)_3CCOCH_2-$ | H | $t-C_4H_9-$ |
| O | S | $(CH_3)_3CCOCH_2-$ | H | $CH_2=CH-CH_2-$ |
| O | S | $(CH_3)_3CCOCH_2-$ | H | $c-C_6H_{11}-$ |
| O | S | $(CH_3)_3CCOCH_2-$ | H | $C_6H_5-$ |
| O | S | $(CH_3)_3CCOCH_2-$ | $CH_3-$ | $CH_3-$ |
| S | O | $CH_2=CH-CH_2$ | H | $C_2H_5-$ |
| S | O | $n-C_6H_{13}-$ | H | $i-C_3H_7-$ |
| S | O | $i-C_4H_9-$ | $CH_3-$ | $CH_3-$ |
| S | O | $(CH_3)_2CH(CH_2)_3CH(CH_3)CH_2CH_2-$ | H | $CH_3-$ |
| S | O | $C_2H_5OCH_2CH_2-$ | H | $CH_3-$ |
| S | O | $CH_2=CH-O-C_2H_4-$ | H | $CH_3-$ |
| S | O | $(CH_3)_3CSCH_2-$ | H | $CH_3-$ |
| S | O | $(CH_3)_3CCOCH_2-$ | H | $CH_3-$ |
| S | O | $(CH_3)_3CCOCH_2-$ | H | $t-C_4H_9-$ |
| S | O | $(CH_3)_3CCOCH_2-$ | H | $CH_2=CH-CH_2-$ |
| S | O | $(CH_3)_3CCOCH_2-$ | H | $c-C_6H_{11}-$ |
| S | O | $(CH_3)_3CCOCH_2-$ | H | $C_6H_5-$ |
| S | O | $(CH_3)_3CCOCH_2-$ | $CH_3-$ | $CH_3-$ |

HERBICIDAL SCREENING TESTS

As previously mentioned, the herein described compounds produced in the above-described manner are phytotoxic compounds which are useful and valuable in controlling various plant species. Compounds of this invention are tested as herbicides in the following manner.

Pre-emergence herbicide test. On the day preceding treatment, seeds of seven different weed species are planted in individual rows using one species per row across the width of the flat. The seeds used are hairy crabgrass (*Digitaris sanguinalis* (L.) Scop.), yellow foxtail (*Setaria glauca* (L.) Beauv.), watergrass (*Echinochloa crusgalli* (L.) Beauv.), California red oat (*Avena sativa* (L.)), redroot pigweed (*Amaranthus retroflexus* (L.)), Indian mustard (*Brassica juncea* (L.) Coss.) and curly dock (*Rumex crispus* (L.)). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent, such as acetone, containing 1 percent Tween 20 (polyoxyethylene sorbitan monolaurate). The following day each flat is sprayed at the rate of 20 pounds of the candidate compound per 142 gallons of solution per acre. An atomizer is used to spray the solution onto the soil surface. The flats are placed in a greenhouse at 80°F. and watered regularly. Two weeks later the degree of weed control is determined by comparing the amount of germination and growth of each weed in the treated flats with weeds in several untreated control flats. The rating system is as follows:

0 = no significant injury (approximately 0-10 per cent control)

3 = slight injury (approximately 10-40 per cent control)

6 = moderate injury (approximately 40-70 per cent control)

9 = severe injury or death (approximately 70-100 per cent control)

An activity index is used to represent the total activity on all seven weed species. The activity index is the sum of the numbers divided by 3, so that an activity index of 21 represents complete control of all seven weeds. The results of this test are reported in Table II.

Post-emergence herbicide test. Seeds of five weed species, including hairy crabgrass, watergrass, California red oats, Indian mustard, and curly dock and one crop pinto beams (*Phaseolus vulgaris*), are planted in flats as described above for pre-emergence screening. The flats are placed in the greenhouse at 72°-85°F. and watered daily with a sprinkler. About 10 to 14 days after planting, when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1 percent Tween 20 (polyoxyethylene sorbitan monolaurate) and then adding 5 ml. of water. The solution is sprayed on the foliage using an atomizer. The spray concentration is 0.5 percent and the rate would be approximately 20 lb/acre if all of the spray were retained on the plant and the soil, but some spray is lost so it is estimated that the application is approximately 12.5 lb/acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for three days after treatment. Water is applied to the soil by means of a slow stream from a watering hose taking care not to wet the foliage.

Injury rates are recorded 14 days after treatment. The rating system is the same as described above for the preemergence test where (0), (3), (6) and (9) are used for the different ratings of injury and control. The injury symptoms are also recorded. The maximum activity index for complete control of all the species in the post-emergence screening test is 18, this index represents the sum of the rating numbers obtained with the six plant species used in the test divided by 3. The herbicide activity index is shown in Table II.

TABLE II

HERBICIDAL ACTIVITY SCREENING RESULTS

| COMPOUND NUMBER | HERBICIDAL ACTIVITY INDEX** | |
|---|---|---|
| | Pre-emergence (20 lb/A) | Post-emergence (12.5 lb/A) |
| 1 | 12 | 18 |
| 2 | 11 | 16 |
| 3 | 11 | 16 |
| 4 | 10 | 6 |
| 5 | 6 | 5 |
| 6 | 10 | 18 |
| 7 | 17 | 18 |
| 8 | 11 | 17 |
| 9 | 17 | 14 |
| 10 | 17 | 18 |
| 11 | 9 | 12 |
| 12 | 14 | 18 |
| 13 | 7 | 16 |
| 14 | 7 | 10 |
| 15 | 10 | 10 |
| 16 | 7 | 12 |
| 17 | 15 | 18 |
| 18 | 13 | 18 |
| 19 | 14 | 18 |
| 20 | 19 | 18 |
| 21 | 13 | 16 |
| 22 | 17 | 18 |
| 23 | 21 | 18 |
| 24 | 9 | 13 |
| 25 | 14 | 16 |
| 26 | 11 | 16 |
| 27 | 9 | 11 |
| 28 | 5 | 16 |
| 29 | 18 | 18 |
| 30 | 18 | 18 |
| 31 | 4 | 14 |
| 32 | 2 | 13 |
| 33 | 13 | 16 |
| 34 | 10 | 16 |
| 35 | 13 | 16 |
| 36 | 6 | 13 |
| 37 | 8 | 16 |
| 38 | 10 | 3 |
| 39 | 17 | 17 |
| 40 | 17 | 16 |
| 41 | 15 | 15 |
| 42 | 14 | 14 |
| 43 | 14 | 12 |
| 44 | 2 | 13 |
| 45 | 1 | 9 |
| 46 | 12 | 14 |
| 47 | 13 | 16 |
| 48 | 6 | 12 |
| 49 | 1 | 3 |
| 50 | 19 | 18 |

** 21 = 70-100% control of all seven plant species tested pre-emergence.
18 = 70-100% control of all six plant species tested post-emergence.

The compounds of the present invention are used as pre-emergence or post-emergence herbicides and are applied in a variety of ways at various concentrations. In practice, the compounds are formulated with an inert carrier, utilizing methods well-known to those skilled in the art, thereby making them suitable for application as dusts, sprays, or drenches and the like, in the form and manner required. The mixtures can be dispersed in water with the aid of a wetting agent or they can be employed in organic liquid compositions, oil and water, water in oil emulsions, with or without the addition of wetting, dispersing or emulsifying agents. An herbicidally effective amount depends upon the nature of the seeds or plants to be controlled and the rate of application varies from 1 to approximately 50 pounds per acre.

The phytotoxic compositions of this invention employing an herbicidally effective amount of the compound described herein are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, as a typical example, the dust and liquid compositions are applied to the soil according to conventional methods and are distributed in the soil to a depth of at least ½ inch below the soil surface. It is not necessary that the phytotoxic compositions be admixed with the soil particles and these compositions can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions, granular compositions or liquid formulations applied to the surface of the soil can be distributed below the surface of the soil by conventional means such as discing, dragging or mixing operations.

The phytotoxic compositions of this invention can also contain other additaments, for example, fertilizers, pesticides and the like, used as adjuvant or in combination with any of the above-described adjuvants. Other phytotoxic compounds useful in combination with the above-described compounds include, for example, 2,4-dichlorophenoxyacetic acids, 2,4,5-trichlorophenoxy-acetic acid, 2-methyl-4-chlorophenoxyacetic acid and the salts, esters and amides thereof; triazine derivatives, such as 2,4-bis(3-methoxypropylamino)-6-methyl-thio-s-triazine; bis(3-methoxypropylamino)-6-methyl-thio-s-triazine; 2-chloro-4-ethylamino-6-isopropylamino-s-triazine, and 2-ethylamino-4-isopropylamino-6-methylmercapto-s-triazine, urea derivatives, such as 3-(3,4-dichlorophenyl)-1,1-dimethyl urea and 3-(p-chlorophenyl)-1,1-dimethyl urea and acetamides such as N,N-diallyl-α-chloroacetamide, N-(α-chloroacetyl)hexamethylene imine, and N,N-diethyl-α-bromacetamide, and the like; benzoic acids such as 3-amino-2,5-dichllorobenzoic; and the thiocarbamates such as S-propyl dipropylthiocarbamate; S-ethyl-dipropylthiocarbamate, S-ethylcyclohexyl-ethyl-thiocarbamate, S-ethyl hexahydro-1H-azepine-1-carbothioate and the like. Fertilizers useful in combination with the active ingredients include, for example, ammonium nitrate, urea and superphosphate. Other useful additaments include materials in which plant organisms take root and grow, such as compost, manure, humus, sand and the like.

The concentration of a compound of the present invention, constituting an effective amount in the best mode of administration in the utility disclosed, is readily determinable by those skilled in the art.

Various changes and modifications are possible without departing from the spirit and scope of the invention described herein and will be apparent to those skilled in the art to which it pertains. It is accordingly intended that the present invention shall only be limited by the scope of the claims.

What is claimed is:

1. A compound having the formula

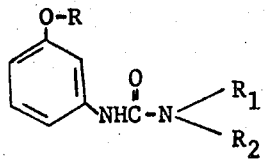

in which R is ketoalkyl of the formula

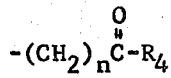

wherein n is 1 or 2 and $R_4$ is straight or branched chain alkyl having 1 to 4 carbon atoms, inclusive, $R_1$ is hydrogen or lower alkyl having 1 to 4 carbon atoms, inclusive, $R_2$ is lower alkyl having 1 to 4 carbon atoms, inclusive, or alkenyl having 3 to 6 carbon atoms, inclusive.

2. A compound according to claim 1 in which $R_1$ is hydrogen and $R_2$ is lower alkyl.

3. A compound according to claim 2 in which R is 3,3-dimethyl-2-butanonyl and $R_2$ is methyl.

4. A compound according to claim 2 in which R is 3,3-dimethyl-2-butanonyl and $R_2$ is ethyl.

5. A compound according to claim 2 in which R is 3,3-dimethyl-2-butanonyl and $R_2$ is isopropyl.

6. A compound according to claim 2 in which R is 3,3-dimethyl-2-butanonyl and $R_2$ is n-butyl.

7. A compound according to claim 2 in which R is 3,3-dimethyl-2-butanonyl and $R_2$ is tert.-butyl.

8. A compound according to claim 1 in which $R_1$ is lower alkyl and $R_2$ is lower alkyl.

9. A compound according to claim 8 in which R is 3,3-dimethyl-2-butanonyl, $R_1$ is methyl and $R_2$ is methyl.

* * * * *